United States Patent [19]

Pfannkuche et al.

[11] Patent Number: 4,859,193
[45] Date of Patent: Aug. 22, 1989

[54] BUS BAR JOINT

[75] Inventors: Heinz Pfannkuche, Bochum; Uwe Schulte, Wetter, both of Fed. Rep. of Germany

[73] Assignee: Mannesmann AG, Duesseldorf, Fed. Rep. of Germany

[21] Appl. No.: 593,557

[22] Filed: Mar. 26, 1984

[30] Foreign Application Priority Data

Mar. 31, 1983 [DE] Fed. Rep. of Germany ....... 3311791

[51] Int. Cl.$^4$ ............................................. H01R 25/02
[52] U.S. Cl. .................................... 439/115; 439/210
[58] Field of Search ....................... 439/115, 210, 213

[56] References Cited

U.S. PATENT DOCUMENTS

| | | | |
|---|---|---|---|
| 2,626,298 | 1/1953 | Hammerly | 339/22 T |
| 2,626,301 | 1/1953 | Hammerly | 339/22 T |
| 3,193,795 | 7/1965 | Krehbiel | 339/252 P |
| 3,831,130 | 8/1974 | Valtonen | 339/21 R |
| 4,018,497 | 4/1977 | Bulanchuk | 339/22 B |
| 4,106,599 | 8/1978 | Howell, Jr. | 191/44.1 |
| 4,135,774 | 1/1979 | Senior et al. | 191/44.1 |

FOREIGN PATENT DOCUMENTS 2237124 6/1975 Fed. Rep. of Germany .
2852267 6/1980 Fed. Rep. of Germany .

Primary Examiner—Eugene F. Desmond
Attorney, Agent, or Firm—Ralf H. Siegemund

[57] ABSTRACT

A joint for two electric current bus bars facing each other with one end each, includes similarly constructed sheet metal plug elements of rectangular cross section, respectively inserted in the bars, but projecting therefrom, and a U-shaped connecting element being a current conductor or an insulator clampingly engages the plug elements for interconnecting them, and having windows receiving strip like extensions of the plug element.

20 Claims, 2 Drawing Sheets

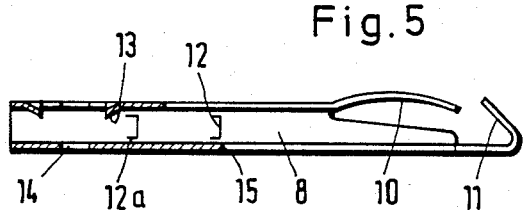
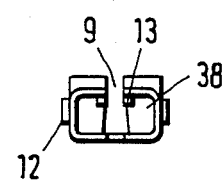
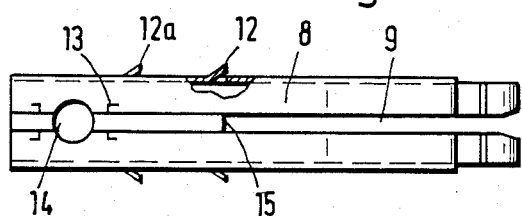
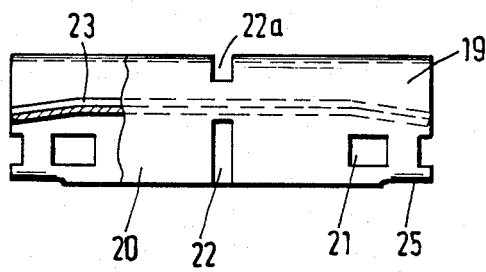
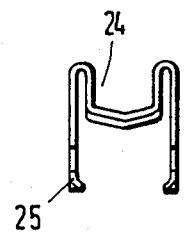
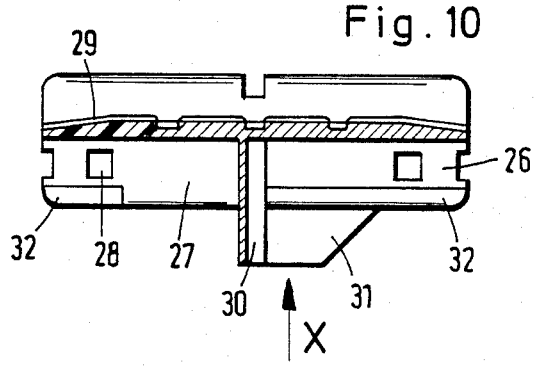
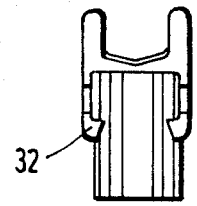
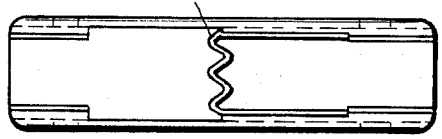

1

BUS BAR JOINT

BACKGROUND OF THE INVENTION

The present invention relates to a connection between adjoining electric current bus bars or rails having certain mutually facing surfaces and cooperating with a slideable or embracing plug element.

German printed Patent Application 2,237,124 suggests a joint of the abutment kind between bus bar or current rails which are provided with certain indents or cavities in longitudinal direction for accommodating a common plug element. This kind of joint and connection permits a connection of the respective bus bar and rails only through sliding them towards each other in order to obtain the abutment kind of joint. Analagously, releasing the joint requires the rails or bars themselves to be pulled apart. The connection of bars and rails in this fashion is made difficult to impossible during assembly by this mode of plugging. In the case of repairs, maintenance or modifications of an installation and system, the required pulling apart of the rails or bars is almost impossible.

German printed Patent Application 2,852,267 illustrates a connection for slide current conductors constructed as tubes which are basically round, but have a longitudinal slot. Adjoining tubes are embraced at the joint by a sleeve which has likewise a slot. In order to position these tubes in relation to each other so that they hold, the tubes are provided with indents into which lugs are inserted, the lugs pertaining to the connecting sleeve. However, these lugs prevent turning of the sleeve of the respective tube ends so that this assembly is made possible only through turning of one of the tubes inside the sleeve. This means that for purpose of removing one of the tubular conductors from the system, that tube must be rotated in its entirety. This kind of procedure is very difficult, particularly in view of the all-covering insulation which by and in itself is not rotatable.

DESCRIPTION OF THE INVENTION

It is an object of the present invention to provide a new and improved connection and joint for electric current bus bars or rails which are to be interconnected in a line, such that the assembly as well as disassembly is greatly facilitated as compared with prior art practice, permitting particularly the inclusion of a joint in an existing system but subsequently and at any point thereof. Possibly the joints permit modifications in the length extension of the bus and rail system. Supplemental to the principal object is the desirability of using the joint or connection as current feedpoint.

In accordance with the preferred embodiment of the present invention it is suggested to insert plug elements into the front ends of the two respectively facing bus bars or rails which plugs protrude or project from the current busses or rails and are clampingly embraced by a connector. This connector has a slide surface for a current collector. This connector may be an electrical connector or an insulation connector.

A joint and connection constructed in accordance with the present invention offers the advantage that the current rails and bus bars can be made at exactly the same length as the respective surrounding isolation elements, so that these current bars and rails with such insulation can be pre-manufactured and transported to the installation site as individual units. Here now the plugs referred to above are slipped into the ends of the respectively adjoining current bars or rails. During assembly the ends of the plugs are embraced by a connector. The entire system can be provided with current rails throughout in this fashion.

It is well known that the exact point or points of feeding current into such a system and the overall control of the current flow can really be determined in its final aspects only during or even after installation. Therefore, it is possible to simply cut an existing current bar in an already completed system together with this insulation in a single step; now the plugs can be inserted, and these may be provided if necessary with connecting terminals for current lines or control lines, whatever is required. Also, the plugs can be provided with funnel-shaped bar or rail ends which may be necessary if a switch is to be installed at that particular location. The connector can simply be installed through slight turning, and removal is carried out analagously.

If the current rails and bus bars can not assume an offset position in relation to each other just for the purposes of including and inserting a plug, then in accordance with a further feature of the invention the distance between the current bars or bus bars to be interconnected should have an initial spacing which is at least as large as the length of a plug element. The short plug elements can now be inserted without any problems into the respective rails.

In accordance with further features of the invention, it is suggested to provide a plug element under utilization of sheet metal and as an open, rectangular profile with a cross section basically resembling a low U or a C. This section should have projecting limits or stops for the embracing connector, as well as resiliently projecting spreading clamps which insure continuous and positive abutment and engagement of the plug with the respective adjoining surface with surface portions of the current or bus bar. The plug element may alternatively be provided with a tongue that prevents pullout. In the case of a current bar with an I-shaped section, the plug should have a longitudinal slot gripping around the center web of this eye-shaped current bar. Furthermore, the plug element should have stops for a nut to be inserted as well as a bore for a screw by means of which a connecting line or wire can be fastened to the current rail or bar for purposes of current feed or control.

In furtherance of the invention the connector for the plugs may have a section which is essentially of U-shaped cross-section whose side surfaces or flanges correspond to the legs of the U and grip around the plug element at its edges. Particular clamping claws are provided for that purpose and are oriented in relation for facing each other. Moreover, these side surfaces of the connecting element should have windows for accommodating projections and stops of the plug, whereby the length of the windows is larger than the length of the stops or projections of the plug reaching into the window, in order to permit thermal expansion thereof. The running surfaces of the connector may have a step elevational platform, or the like, for a running current collector, which control or elevational surfaces guide the current collector over any burr or the like at the end of one or the other of the current and bus bars as interconnected.

The connecting element is used for instance as a connector for current bars, and is made of sheet metal. In other cases it is constructed as an isolation and insulating connector, and is made of electrically insulating synthetic material accordingly. In the latter case, there should be an insulating bar which projects into a free space between the adjoining plug elements, and thus provides an increase in the air and leakage current path. Moreover, an insulative connector should be constructed from corrugated material in order to establish a certain degree of resiliency. The connector, moreover, may be provided with support bars at the side flanges in order to enhance mechanical strength.

In accordance with a further feature of the invention, the connector may be embraced by a C-shaped abutment connector which extends beyond the isolation of the current bars. This abutment connector may have side surfaces which are provided with clamping edges reaching around the side bars of the current and bus bars, and therefore can be connected and fastened thereto. For freeing the abutment location, this abutment connector may be provided with a slide slot for accommodating a tool by means of which this supplemental connector can be shifted on one or the other adjoining insulation.

DESCRIPTION OF THE DRAWINGS

While the specification concludes with claims, particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 5 illustrates a connector in accordance with the preferred embodiment of the present invention, the illustration is in side elevation;

FIG. 6 is a front view of the part shown in FIG. 5;

FIG. 7 is a top elevation of the plug element shown in FIG. 5;

FIG. 8 is a current rail and bus connector in side view as shown in FIG. 1 still constituting an example of the preferred embodiment;

FIG. 9 is a front view of the connector shown in FIG. 8;

FIG. 10 is a side elevation of an insulation connector as shown in FIG. 3 still in accordance with the preferred embodiment of the present invention;

FIG. 11 is a front view of the connector shown in FIG. 10; and

FIG. 12 is a view of the insulating connector shown in FIGS. 10 and 11, but as seen in the direction X indicated in FIG. 10.

Figure 1:
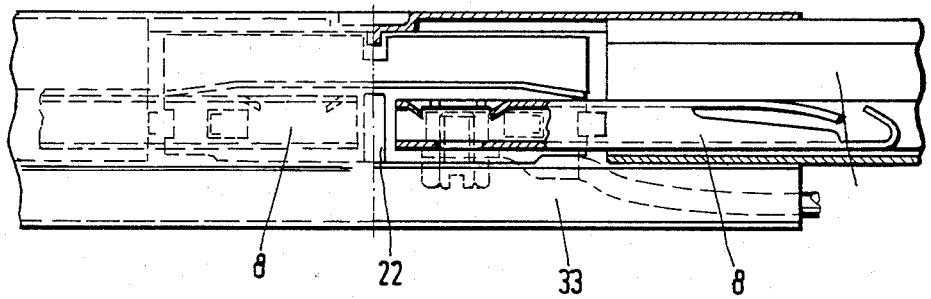
FIG. 1 is a section through current bus bars and rails wherein the connection in accordance with the preferred embodiment of the present invention is shown in side view.
Figure 2:
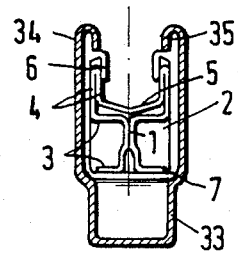
FIG. 2 is a cross section through one of the current bars shown in FIG. 1.
Figure 3:
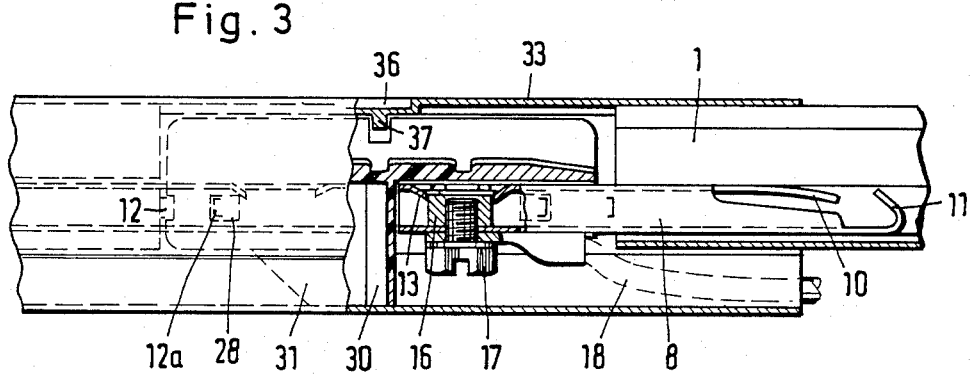
FIG. 3 illustrates two basically similarly constructed current bars, but with an isolation connector and inside views.
Figure 4:
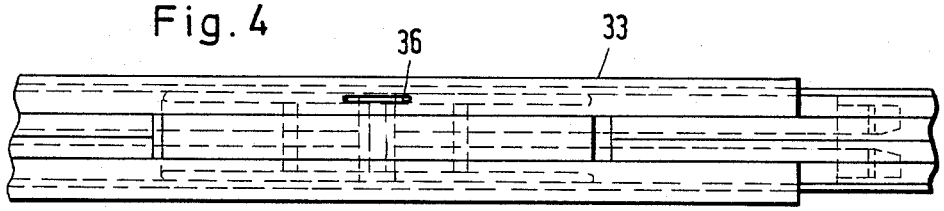
FIG. 4 is a top elevation of the structure shown in FIG. 3.

Proceeding now to the detailed description of the drawings, a current rail and bus bar 1 may be constructed as shown particularly in FIG. 2 from a rolled sheet metal piece, and is provided as an element with I shaped section. A second bus bar 1' is spaced from bar 1 by a distance having accordingly a central web 2 through with adjoining flanges 3. Two plugged elements 8 are respectively inserted in rails 1 and 1', respectively, but portions such as 8' protrude or project from the respective rail. These plugged elements 8 will be described more fully below; it abuts the flanges 3. A pair of side bar or ridges 4 are provided as a continuation of the upper flange 3. These bars or ridges 4, together with a slide surface 5 establish a U-shaped profile on which a current collector can run. Holding strips 6 of a thin U-shaped insulation rail 7 reach around the side bars 4. The plug 8 is inserted into one of the current rails 1, as shown in FIGS. 1 and 3. Another plug element of the same construction is inserted in rail 1'. The insertion is carried out from the front end of either bus bar which basically looks as shown in FIG. 2. The plug element is of the type shown in FIGS. 5, 6 and 7.

Proceeding now to the detailed description of the plug element 8, one can see from FIG. 6 that it has a section 38 resembling a C. The plug element 8 is made of sheet metal. It is provided with a slot 9 which extends up to and beyond an internal stop 15 which limits insertion of the plug element into a bus bar. The slot in effect will receive the center web 2 of the current rail 1. The lower surface of the C profile or section is provided with a pullout safety tongue 11, which is bent over at one end, and will project beyond the upper edge whenever the plug has not been inserted. Upon insertion of the plug into the current rail and bus bar, this tongue 11 is pressed down and cuts itself into upper flange 3. In the case of any pull on the plug into the upper flange 3 of the current rail 1, it arrests tongue 11 and thereby prevents pullout of the plug which is thus locked.

A bent spreading clamp 10 abuts further at the flange 3 in order to provide broad electrical contact making thereat, avoiding the creation of any local high resistance (electrical) area. The side surfaces and flanges of the plug 8, resembling the short base of the C are provided with projecting stops which reach into windows 21 or 28. As shown in FIGS. 1 and 8, there is provided a current connector 19, which provides for current load continuation and embraces clampingly the plug elements 8. This connector 19 is provided with a window 21, and the stops 12A of the side surfaces of the plug 8 reach into this window. Alternatively, as shown in FIGS. 3 and 10, an insulating connector 26 may be provided also for enhancing clampingly the plug elements 8 and having windows 28, and whenever it is employed, these stops 12A of the plug 8 extend into the window or windows 28.

The stops 12 and 12A of the plug 8 serve as stops for the isolating and insulation rail 7. Each plug 8 is, furthermore, provided with a bore 14 for receiving a screw 17, as shown in FIG. 3. Moreover, inwardly projecting nut stops 13 are provided for receiving a nut 16 which can be inserted, having a square-shaped contour. These steps or stops 13 extend sufficiently far into the C section of the plug 8, such that the stops 13 near the end of the plug 8 will be slightly lifted upon insertion of the nut 16 from the left in FIG. 5. After completion of insertion of the nut they relax to some extent and hold the nut in that position so that subsequently a connecting line 18 can be secured thereto under the utilization of that screw 17.

As stated, FIGS. 8 and 9 illustrate the current bar connector 19 with windows 21 for the stops 12A provided specifically in side flanges 20, one of them having a slot 22. This slot permits different spreading of the two ends of the current connector in the case the current bars to be interconnected are differently wide, but uniform contact making pressure is and must be assured in this fashion. A slide surface 24 is provided with an elevation 23 in the central portion of the current connector 19. This elevation 23 permits and provides for lifting of any current collector that slides on the system in order to carry it over any burr or the like that may still be present at the end of one of the current bars 1. The side flanges 20 are provided with clamping claws 25 which face each other at the ends of the flanges 20 and below. These claws pertain to the current bar connector 19 and reach around the edge of the plug 8, for clamping the connector to both plugs thereby interconnecting them.

The isolation or insulation connector 26 is illustrated in detail in FIGS. 10, 11 and 12, and as stated, its side flanges 27 are likewise provided with windows 28; also there are clamping claws 32, as well as an elevation 29 for lifting of a current collector that passes over. In addition to the foregoing, the insulating collector 26 is provided with a corrugating insulating bar 30 which is held in the desired position by means of a bar or support 31. The insulating bar 30 has as its task to insulate the space between the inserted plug elements 8.

The joint between the two current bars is embraced by an abutment connector 33, as shown in FIGS. 1 through 4. This abutment connector 33 has side portions 34, which in turn are continued in clamping edges 35, which grip around the upper edge of the insulating bar surface. The abutment connector 33 is provided with a side slot 36 for permitting insertion of a tool such as a screw driver, or the like, by means of which this element 33 can be shifted in one direction or the other so as to free the joint and provide immediate access thereto. The abutment connector 33 is provided with a pin 37 which is inserted in a notch or indent 22a of the current connector 19 and in a corresponding notch (22a) in the isolating or insulating connector 26 so as to be locked against accidental or undesired shifting.

The invention is not limited to the embodiments described above, but all changes and modifications thereof not constituting departures from the spirit and scope of the invention, are intended to be included.

We claim:

1. Joint for connecting the facing ends of two electric current bus bars facing each other with one end each, comprising:
    a first and a second, similarly constructed plug element, respectively inserted in each end of said bars, but each having a particular portion projecting from the respective bar; and
    a connecting element laterally reaching around both plug elements and clampingly embracing and engaging said projecting portions of the plug elements for interconnecting.

2. Joint as in claim 1, wherein each of said plug element is a sheet metal element of rectangular cross section, one long side thereof being open, so that its cross section resembles a C.

3. Joint in accordance with claim 2, each said plug element having laterally extending projections for engaging the connecting element, as well as an insulating bar pertaining to the respective bus bar.

4. Joint as in claim 2, wherein said bus bars are provided with flanges, each said plug element being provided with a spreading clamp engagingly abutting the respective flange.

5. Joint as in claim 2, said plug element being provided with a pull-out preventing tongue, resiliently biased for clampingly engaging the respective bus bars.

6. Joint as in claim 2, wherein said bus bars have an I shaped cross section, there being a center web accordingly, said open side of the rectangle of the plug element receiving said center web, there being a stop included in said plug element for limiting the insertion of the plug element into the respective bus bars.

7. Joint as in claim 2, one portion of the plug element extending from the respective bus bar being provided with stop means for receiving a threaded nut, the plug element further provided with a bore for receiving a screw to be screwed into said nut, for purposes of fastening an electrical conductor thereto.

8. Joint in accordance with claim 1, the connecting element having a cross section which is essentially U shaped, there being inwardly directed side flanges on the legs of the U, said side flanges having inwardly oriented clamping claws, gripping around edges of the respective plug element.

9. Joint as in claim 8, wherein said side flanges of the connecting element are provided with windows receiving inserted stop like extensions of the plug element.

10. Joint as in claim 9, said windows having a larger length than the length of the inserted projections.

11. Joint as in claim 8, said connecting element having running surfaces, there being a portion of a higher elevation than the remainder of the running surfaces.

12. Joint as in claim 8, at least one of the said flanges having a vertical slot.

13. Joint as in claim 8, said connecting element being made of sheet metal, to serve as electric current connector.

14. Joint as in claim 8, said connecting element being an insulating element, made of an electrically insulating synthetic material.

15. Joint as in claim 14, said connecting element having an insulation bar projecting in a space between the two inserted plug elements.

16. Joint as in claim 15, said insulating bar being corrugated and having side elements bearing against side flanges of the connecting element.

17. Joint as in claim 1, wherein the connecting element is gripped by a C shaped abutting connector having side flanges with clamping edges gripping around the current bus bars.

18. Joint as in claim 17, said abutting connector being provided with a slot permitting its lateral shifting on the two bus bars.

19. Joint as in claim 17, there being pin and indent means for securing the abutting connector to the connecting element.

20. Joint as in claim 1, wherein the distance between the bus bars to be interconnected, is at least as wide as the length of one of the plug elements.

* * * * *